(12) United States Patent
Song et al.

(10) Patent No.: US 11,461,976 B2
(45) Date of Patent: Oct. 4, 2022

(54) VISUALIZATION TRANSITIONS FOR AUGMENTED REALITY

(71) Applicant: Mapbox, Inc., San Francisco, CA (US)

(72) Inventors: Siyu Song, San Francisco, CA (US); David Aaron Rhodes, Espoo (FI)

(73) Assignee: Mapbox, Inc., Washington, DC (US)

( * ) Notice: Subject to any disclaimer, the term of this patent is extended or adjusted under 35 U.S.C. 154(b) by 0 days.

(21) Appl. No.: 16/163,278

(22) Filed: Oct. 17, 2018

(65) Prior Publication Data

US 2020/0126300 A1 Apr. 23, 2020

(51) Int. Cl.
| | | |
|---|---|---|
| *G06T 19/00* | (2011.01) | |
| *G06T 17/05* | (2011.01) | |
| *G01C 21/36* | (2006.01) | |
| *H04W 4/021* | (2018.01) | |

(52) U.S. Cl.
CPC ........ *G06T 19/006* (2013.01); *G01C 21/3638* (2013.01); *G01C 21/3644* (2013.01); *G06T 17/05* (2013.01); *H04W 4/021* (2013.01)

(58) Field of Classification Search
None
See application file for complete search history.

(56) References Cited

U.S. PATENT DOCUMENTS

| | | | | |
|---|---|---|---|---|
| 7,079,945 B1* | 7/2006 | Kaplan | ................. | G01C 21/26 340/988 |
| 7,746,343 B1 | 6/2010 | Charaniya et al. | | |
| 8,984,099 B1 | 3/2015 | Giencke et al. | | |
| 10,026,229 B1* | 7/2018 | Yalniz | ................. | G06K 9/00671 |
| 2007/0273644 A1* | 11/2007 | Mondine Natucci | ........................ | H04N 1/00323 345/156 |
| 2010/0023252 A1* | 1/2010 | Mays | ................. | G01C 21/3423 701/533 |
| 2010/0087207 A1* | 4/2010 | Tsurutome | ......... | G01C 21/3679 455/456.3 |
| 2010/0153000 A1* | 6/2010 | Akita | ................. | G01C 21/3632 701/429 |
| 2010/0215250 A1 | 8/2010 | Zhu | | |
| 2011/0016893 A1 | 1/2011 | Dawes | | |
| 2011/0310087 A1* | 12/2011 | Wright, Jr. | ............ | G06T 19/003 345/419 |

(Continued)

OTHER PUBLICATIONS

Blippar, "Welcome to 'AR City': Beta Augmented Reality Maps and Navigation by Blippar", Nov. 7, 2017, URL: https://www.youtube.com/watch?v=AgRdutPZNug (Year: 2017).*

(Continued)

*Primary Examiner* — David H Chu
(74) *Attorney, Agent, or Firm* — Fenwick & West LLP

(57) ABSTRACT

An augmented reality (AR) module receives a location notification including a current location from a client device. The AR module determines an AR tabletop view based on the current location. The AR tabletop view includes geographic information representing a geographic area that includes the current location. The AR module sends the AR tabletop view to the client device. The AR module receives a destination notification including a destination location within the represented geographic area. The AR module transitions the AR tabletop view into an AR world view based on the current location and the destination location. The AR module sends the AR world view to the client device for display.

18 Claims, 9 Drawing Sheets

(56) References Cited

U.S. PATENT DOCUMENTS

| | | | |
|---|---|---|---|
| 2012/0059720 A1* | 3/2012 | Musabji | G06T 17/05 |
| | | | 705/14.58 |
| 2013/0050262 A1 | 2/2013 | Jeon | |
| 2013/0095855 A1 | 4/2013 | Bort | |
| 2013/0322634 A1* | 12/2013 | Bennett | G10L 21/00 |
| | | | 381/17 |
| 2014/0006966 A1* | 1/2014 | Geraci | G06T 19/006 |
| | | | 715/748 |
| 2014/0225898 A1* | 8/2014 | Fyke | G06T 11/00 |
| | | | 345/473 |
| 2014/0266585 A1* | 9/2014 | Chao | H04W 4/33 |
| | | | 340/5.61 |
| 2014/0340394 A1* | 11/2014 | Mattila | G06T 19/00 |
| | | | 345/420 |
| 2015/0116349 A1 | 4/2015 | Hamada et al. | |
| 2016/0025497 A1* | 1/2016 | Baalu | H04L 67/12 |
| | | | 701/430 |
| 2017/0052654 A1* | 2/2017 | Cervelli | G06T 19/006 |
| 2017/0227372 A1* | 8/2017 | Chen | G01C 21/265 |
| 2018/0075644 A1 | 3/2018 | Johnston et al. | |
| 2018/0357824 A1 | 12/2018 | Wu et al. | |
| 2019/0043260 A1* | 2/2019 | Anderson | G06V 40/20 |

OTHER PUBLICATIONS

Extrareality, "Welcome to Cambridge—Augmented Reality Map Application", Aug. 22, 2010, URL: https://www.youtube.com/watch?v=qy6z8RaKQ9g (Year: 2010).*

MobiDev, "Augmented Reality Indoor Navigation Demo—ARCore based", URL: https://www.youtube.com/watch?v=eQXKEnrHMxw, Sep. 6, 2018 (Year: 2018).*

Thegameveda, "Microsoft HoloLens : An hour with HoloMaps from Seattle to checking tweets atop Trump Tower", Dec. 27, 2016, URL: https://www.youtube.com/watch?v=7mtS_224mKU (Year: 2016).*

* cited by examiner

VISUALIZATION TRANSITIONS FOR AUGMENTED REALITY

TECHNICAL FIELD

This disclosure relates generally to the field of augmented reality and in particular to the field of procedurally-generated, world-scale augmented reality.

BACKGROUND

Digitally stored electronic maps are used to provide directions to users of mobile and other computing devices, for example, using any of a wide array of standalone map or direction application programs or apps. Today's electronic devices correctly determine where a mobile device is within a few feet or meters, and can show where the user of that mobile device is on the electronic map in real time.

Electronic maps also appear in other applications aside from standalone mapping applications. For example, navigation applications, ride sharing applications, taxi applications, video games, and other applications may use electronic maps. These or other applications can obtain electronic maps by calling a map server computer through an Application Programming Interface (API). Thus, a single electronic map provider that owns or operates the server computer may supply the electronic maps for many different applications.

Augmented reality (AR) is the augmentation of a real-world environment using computer-generated elements, such as graphical elements or audio elements, in such a manner that the elements are perceived by a user as immersive components of the real-world environment. AR may be viewed by the user via a display, such as a display upon a client device (e.g., a mobile device or other computing device).

SUMMARY

An augmented reality (AR) module receives a location notification including a current location from a client device. The AR module determines an AR tabletop view based on the current location. The AR tabletop view includes geographic information, e.g. vector data, representing a geographic area that includes the current location, represented as an AR tabletop element that includes a three-dimensional scaled down version of the geographic area. For example, the geographic area is an area including locations within a threshold distance of the current location, and the AR tabletop element is a miniature cityscape. The AR module sends the AR tabletop view to the client device for display.

The AR module receives a destination notification including a destination location. For example, the destination location may be a location within the geographic area that a user has selected using a user interface of the AR tabletop view. The AR module transitions the AR tabletop view into an AR world view based on the current location and the destination location. The transition may involve an animation transforming the AR tabletop view into the AR world view. The AR world view is a world-scale representation of geographic information that visualizes a path from the current location to the destination location. The AR module sends the AR world view to the client device for display.

Figure 1:
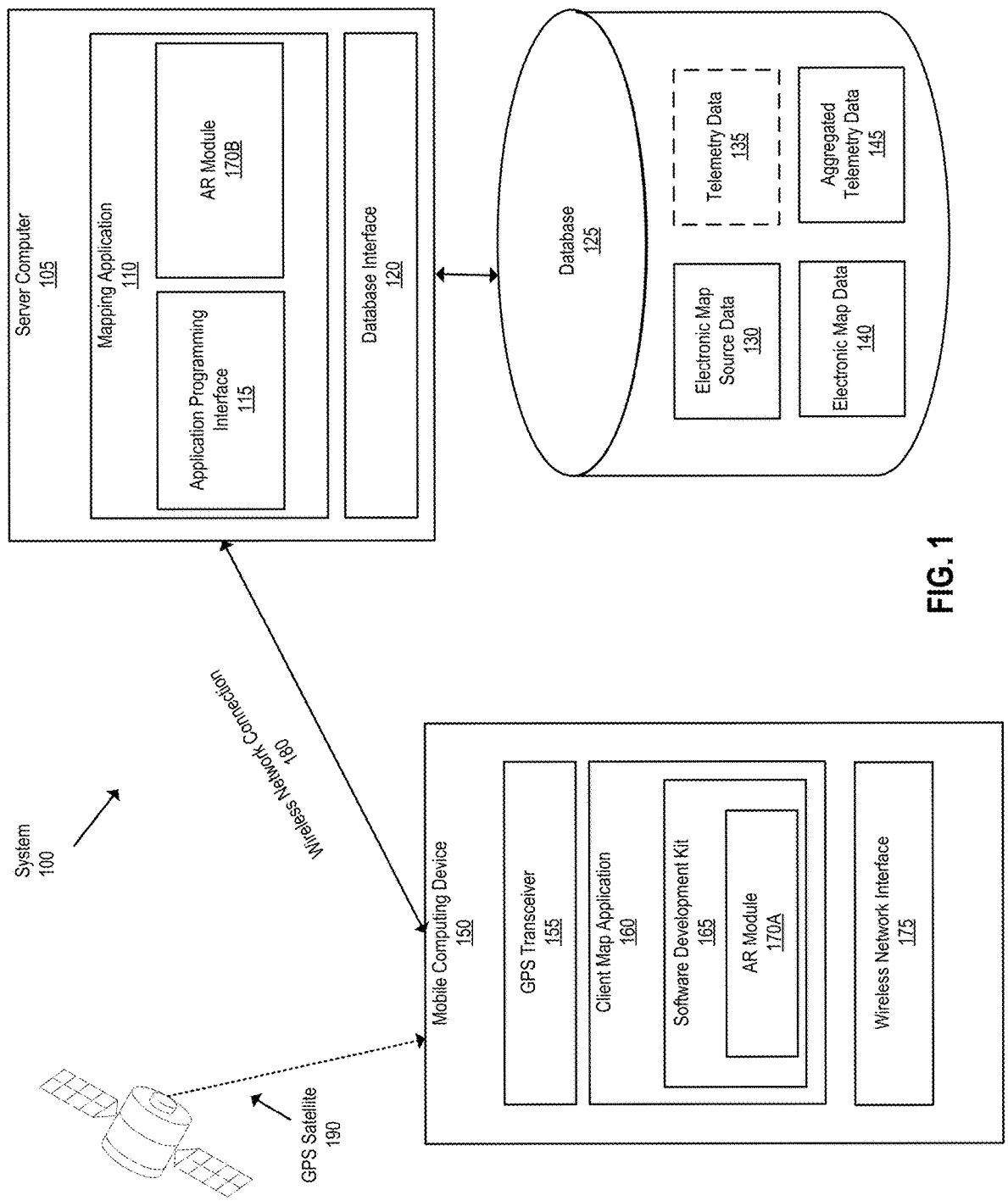
FIG. 1 illustrates a computer system in which the techniques described may be practiced, according to one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

I. General Overview

Augmented reality (AR) is a developing field. How to incorporate AR with world-scale, real-world environments to create functional user experiences, i.e., AR experiences, is an ongoing problem. The problem is further complicated by the unreliability of location and bearing estimations, which can cause world-scale AR objects in an AR experience to appear out of place, breaking the immersion of the AR experience. AR experiences include various AR views, which may change as a camera used to incorporate the real-world environment is panned or otherwise moved.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Vector tiles are vector data similar to image tiles for web mapping. Vector tiles define geometries and properties of an electronic map, but not full visual style. The same vector tiles can be used to generate maps of varying visual styles—a dark, nighttime style can use the same vector tiles as a light, daytime style for visualization, for example. Styles are sets of rules, created independently of vector tiles, which define the visual appearance of an electronic map when it is rendered. A style can include information about data sources, style layers, sprites, glyphs, and metadata, for example.

Vector data can include geometry data representing map features such as roads, bodies of water, public parks, buildings, and so on, as well as metadata corresponding to map features, such as textual labels. An electronic map is rendered from one or more vector tiles when requested by a client, such as a web browser or a mobile application, by applying a styling to the vector data of the vector tiles to create one or more layers used to visualize map features. Map features can be represented in a rendered electronic map by graphical elements, which are used to convey map information to a user of the electronic map. Graphical elements may include, for example, lines, textures, and colors. Each layer is a stylized representation of a portion of an electronic map based on both vector data and styling rules. For example, one layer may represent all highways within the geographic area represented by an electronic map. A second layer may include label graphical elements that label other graphical elements within the electronic map. An electronic map including more than one layer renders the layers one at a time in a predetermined order of highest priority layer to lowest priority layer. Layer priority may be based on the content of each layer, or may be set by a creator of the electronic map.

The electronic map may be displayed at any of a plurality of zoom levels. For example, electronic maps may be displayed at zoom levels from 0 to 22; in some embodiments, incremental zoom levels may be selected, such as 2.01, 2.02, or other fractional zooms. In an embodiment, zooming is continuous from a maximum level to a minimum level and vice versa. Each zoom level corresponds with one or more vector tiles for that level, as well as with one or more styles, which can change as the electronic map is zoomed in or out. For example, the opacity of a line may change as a function of zoom level. Similarly, different layers may be displayed at different zoom levels, and those different layers may use different geometry data and metadata depending upon their specific associated vector tiles.

The electronic map can be displayed at a number of combinations of zoom, bearing, and pitch, and may be panned to display different sections of the electronic map. Adjusting the zoom, bearing, or pitch may change which graphical elements are rendered and/or how they are rendered. For example, when zoom level changes from level 2 (z2) to level 3 (z3) and z3 vector tiles (with data other than or additional to that of the z2 vector tiles) are loaded and used for rendering, additional graphical elements not included in the z2 vector tiles (but included in the z3 vector tiles) are rendered. Henceforth in this specification a zoom level may be referred to by "z" followed by its numerical value, such as z3. Vector tiles may likewise be referred to by a specific associated zoom level, such as z3 vector tiles. Similarly, graphical elements in general may be referred to as "symbols."

II. System Overview

Computer-implemented techniques are provided for world-scale AR experiences. FIG. 1 illustrates an example computer system in which the techniques provided may be practiced, according to one embodiment.

FIG. 1 uses like reference numerals to identify like elements. A letter after a reference numeral, such as "115A," indicates that the text refers specifically to the element having that particular reference numeral. A reference numeral in the text without a following letter, such as "115," refers to any or all of the elements in the figures bearing that reference numeral. For example, "115" in the text refers to reference numerals "115A," and/or "115B" in the figures.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 150 that is coupled via a wireless network connection 180 to a server computer 105, which is coupled to a database 125. A GPS satellite 190 is coupled via a wireless connection to the mobile computing device 150. The server computer 105 comprises a mapping application 110, an application programming interface (API) 115, a collision handling module 170B and a database interface 120. The database 125 comprises electronic map source data 130, electronic map data 140, telemetry data 135, and aggregated telemetry data 145. The mobile computing device 150 comprises a GPS transceiver 155, client map application 160, software development kit (SDK) 165, AR Module 170A, and wireless network interface 175. As used herein, the mobile computing device 150 or other computing devices are referred to generally as "client devices." In an embodiment, the client device is a headset, such as goggles, or may be a set of multiple devices, such as a headset and a mobile computing device 150 coupled, physically or otherwise, thereto.

II.A. Server and Database

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 105 broadly represents one or multiple server computers, such as a server cluster, and the server computer may be located in one or more physical locations. Server computer 105 also may represent one or more virtual computing instances that execute using one or more computers in a datacenter such as a virtual server farm.

Server computer 105 is communicatively connected to database 125 and mobile computing device 150 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 120, to facilitate various aspects of embodiments described herein.

In one embodiment, database interface 120 is a programmatic interface such as JDBC or ODBC for communicating with database 125. Database interface 120 may communicate with any number of databases and any type of database, in any format. Database interface 120 may be a piece of custom software created by an entity associated with mapping application 110, or may be created by a third party entity in part or in whole.

In one embodiment, database 125 is a data storage subsystem consisting of programs and data that is stored on any suitable storage device such as one or more hard disk drives, memories, or any other electronic digital data recording device configured to store data. Although database 125 is depicted as a single device in FIG. 1, database 125 may span multiple devices located in one or more physical locations. For example, database 125 may include one or more nodes located at one or more data warehouses. Additionally, in one embodiment, database 125 may be located on the same device or devices as server computer 105. Alternatively, database 125 may be located on a separate device or devices from server computer 105.

Database 125 may be in any format, such as a relational database, a noSQL database, or any other format. Database 125 is communicatively connected with server computer 105 through any kind of computer network using any combination of wired and wireless communication of the type previously described. Optionally, database 125 may be communicatively connected with other components, either directly or indirectly, such as one or more third party data suppliers. Generally, database 125 stores data related to electronic maps including, but not limited to: electronic map source data 130, electronic map data 140, telemetry data 135, and aggregated telemetry data 145. These datasets may be stored as columnar data in a relational database or as flat files.

In one embodiment, electronic map source data 130 is raw digital map data that is obtained, downloaded or received from a variety of sources. The raw digital map data may include satellite images, digital street data, building or place data or terrain data. Example sources include National Aeronautics and Space Administration (NASA), United States Geological Survey (USGS), and DigitalGlobe. Electronic map source data 130 may be updated at any suitable interval, and may be stored for any amount of time. Once obtained or received, electronic map source data 130 is used to generate electronic map data 140.

In one embodiment, electronic map data 140 is digital map data that is provided, either directly or indirectly, to client map applications, such as client map application 160, using an API. Electronic map data 140 is based on electronic map source data 130. Specifically, electronic map source data 130 is processed and organized as a plurality of vector tiles which may be subject to style data to impose different display styles, and which may be organized in a tile pyramid. Electronic map data 140 may be updated at any suitable interval, and may include additional information beyond that derived from electronic map source data 130. For example, using aggregated telemetry data 145, discussed below, various additional information may be stored in the vector tiles, such as traffic patterns, turn restrictions, detours, common or popular routes, speed limits, new streets, and any other information related to electronic maps or the use of electronic maps.

In one embodiment, telemetry data 135 is digital data that is obtained or received from mobile computing devices via function calls that are included in a Software Development Kit (SDK) that application developers use to integrate and include electronic maps in applications. As indicated by the dotted lines, telemetry data 135 may be transiently stored, and is processed as discussed below before storage as aggregated telemetry data 145.

The telemetry data may include mobile device location information based on GPS signals. For example, telemetry data 135 may comprise one or more digitally stored events, in which each event comprises a plurality of event attribute values. Telemetry events may include: session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and timestamp.

In one embodiment, aggregated telemetry data 145 is telemetry data 135 that has been processed using anonymization, chunking, filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be from John's house to point A, a separate trip from point A to point B, and another separate trip from point B to John's office. Chunking may also remove or obscure start points, end points, or otherwise break telemetry data into any size. Filtering may remove inconsistent or irregular data, delete traces or trips that lack sufficient data points, or exclude any type or portion of data for any reason. Once processed, aggregated telemetry data 145 is stored in association with one or more tiles related to electronic map data 140. Aggregated telemetry data 145 may be stored for any amount of time, such as a day, a week, or more. Aggregated telemetry data 145 may be further processed or used by various applications or functions as needed.

II.B. Mobile Computing Device

In one embodiment, mobile computing device 150 is any mobile computing device, such as a laptop computer, handheld computer, wearable computer, cellular or mobile phone, portable digital assistant (PDA), or tablet computer. Alternatively, mobile computing device 150 could be a desktop computer or an interactive kiosk. Although a single mobile computing device is depicted in FIG. 1, any number of mobile computing devices may be present. Each mobile computing device 150 is communicatively connected to server computer 105 through wireless network connection 180 which comprises any combination of a LAN, a WAN, one or more internetworks such as the public Internet, a cellular network, or a company network. Furthermore, though not illustrated in FIG. 1 for purposes of clarity, the mobile computing device 150 may include one or more databases, which in turn may store some or all electronic map data 140. Reference herein to the database 125 or to retrieval or other action upon data stored in the database 125 can alternatively reference a database local to the client, such as a cache, in other embodiments.

Mobile computing device 150 is communicatively coupled to GPS satellite 190 using GPS transceiver 155. GPS transceiver 155 is a transceiver used by mobile computing device 150 to receive signals from GPS satellite 190, which broadly represents three or more satellites from which the mobile computing device may receive signals for resolution into a latitude-longitude position via triangulation calculations.

Mobile computing device 150 also includes wireless network interface 175 which is used by the mobile computing device to communicate wirelessly with other devices. In particular, wireless network interface 175 is used to establish wireless network connection 180 to server computer 105. Wireless network interface 175 may use WiFi, WiMAX, Bluetooth, ZigBee, cellular standards or others.

Mobile computing device 150 also includes AR module 170A which is used by the mobile computing device as part of the client map application 160 to provide AR functionality. In some embodiments AR module 170A collaborates with AR module 170B of the server computer 105 to provide AR functionality. Alternatively, either AR module 170A or AR module 170B solely provides AR functionality, in which case the other module may not be present in the system.

Mobile computing device 150 also includes other hardware elements, such as one or more input devices, memory, processors, and the like, which are not depicted in FIG. 1.

Mobile computing device 150 also includes applications, software, and other executable instructions to facilitate various aspects of embodiments described herein. These applications, software, and other executable instructions may be installed by a user, owner, manufacturer, or other entity related to mobile computing device 150. In one embodiment, mobile computing device 150 includes client map application 160 which is software that displays, uses, supports, or otherwise provides electronic mapping functionality as part of the application or software. Client map application 160 may be any type of application, such as a taxi service, a video game, a chat client, a food delivery application, etc. In an embodiment, client map application 160 obtains electronic mapping functions through SDK 165, which may implement functional calls, callbacks, methods or other programmatic means for contacting the server computer to obtain digital map tiles, layer data, or other data that can form the basis of visually rendering a map as part of the application. In general, SDK 165 is a software development kit that allows developers to implement electronic mapping without having to design all of the components from scratch. For example, SDK 165 may be downloaded from the Internet by developers, and subsequently incorporated into an application which is later used by individual users.

In server computer 105, the mapping application 110 provides the API 115 that may be accessed, for example, by client map application 160 using SDK 165 to provide electronic mapping to client map application 160. Specifically, mapping application 110 comprises program instructions that are programmed or configured to perform a variety of backend functions needed for electronic mapping including, but not limited to: sending electronic map data to mobile computing devices, receiving telemetry data 135 from mobile computing devices, processing telemetry data to generate aggregated telemetry data 145, receiving electronic map source data 130 from data providers, processing electronic map source data 130 to generate electronic map data 140, and any other aspects of embodiments described herein. Mapping application 110 includes AR module 170B which may be used to enable AR functionality with client map application 160. Depending upon embodiment, AR functionality may be provided wholly on the mobile computing device 150 via AR module 170A, wholly on the server computer 105 via AR module 170B, or in part by each AR module 170 working in conjunction.

II.C. Hardware Environment

According to one embodiment, the techniques described herein are implemented by one or more special-purpose computing devices. For example, the server computer 105 and mobile computing device 150 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 2:
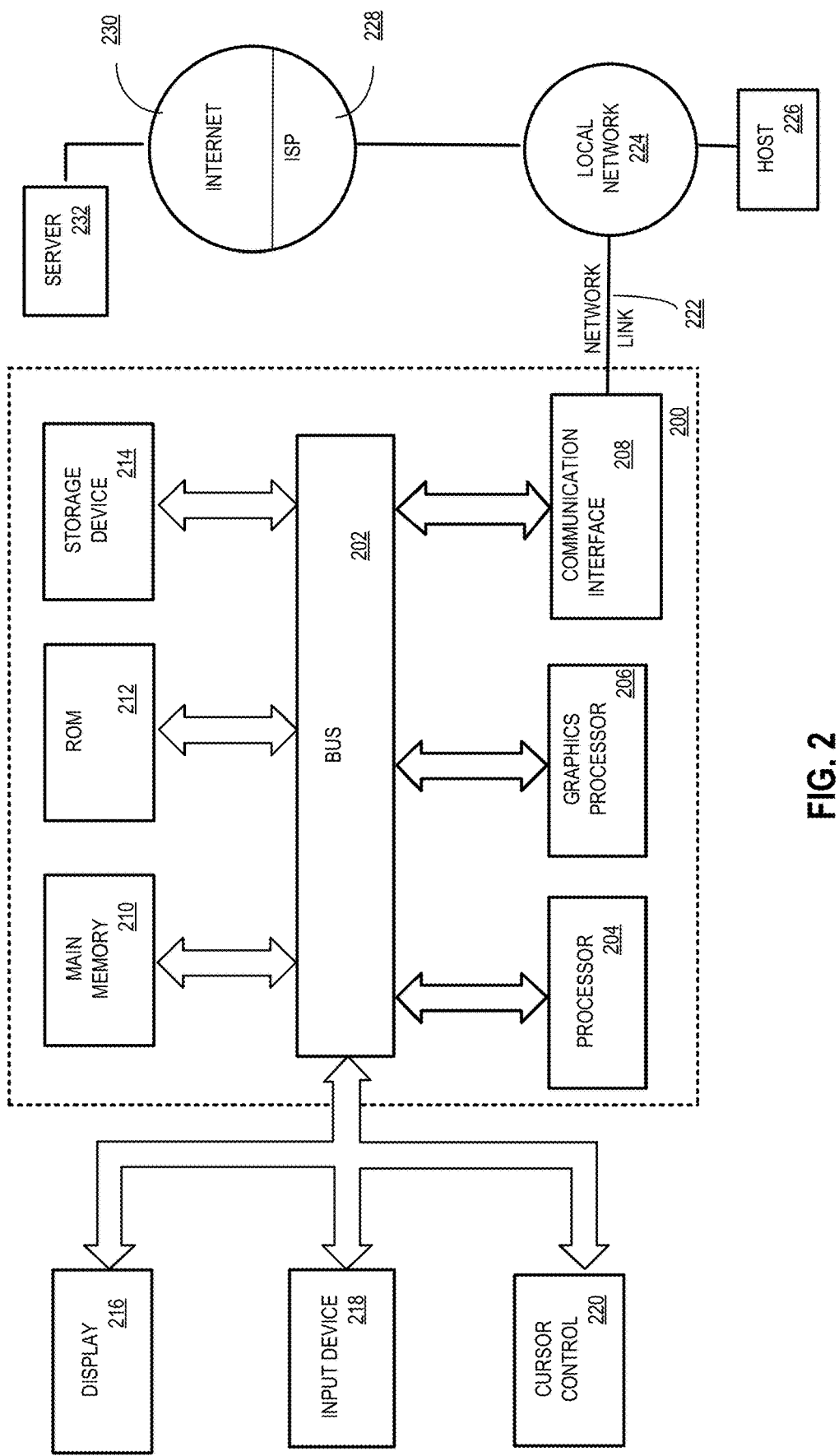
FIG. 2 is a block diagram that illustrates a computer system upon which an embodiment may be implemented.

For example, FIG. 2 is a block diagram that illustrates a computer system 200 upon which an embodiment of the invention may be implemented. Computer system 200 includes a bus 202 or other communication mechanism for communicating information, and a hardware processor (CPU) 204 and graphics processor (GPU) 206 coupled with bus 202 for processing information. CPU 204 may be, for example, a general purpose microprocessor. GPU 206 may be, for example, a graphics processing unit with a high core count which is optimized for parallel processing and graphics rendering.

Computer system 200 also includes a main memory 210, such as a random access memory (RAM) or other dynamic storage device, coupled to bus 202 for storing information and instructions to be executed by CPU 204. Main memory 210 also may be used for storing temporary variables or other intermediate information during execution of instructions to be executed by CPU 204 and/or GPU 206. Such instructions, when stored in non-transitory storage media accessible to CPU 204 and/or GPU 206, render computer system 200 into a special-purpose machine that is customized to perform the operations specified in the instructions.

Computer system 200 further includes a read only memory (ROM) 212 or other static storage device coupled to bus 202 for storing static information and instructions for CPU 204 and/or GPU 204. A storage device 214, such as a magnetic disk or optical disk, is provided and coupled to bus 202 for storing information and instructions.

Computer system 200 may be coupled via bus 202 to a display 216, such as an LCD screen, LED screen, or touch screen, for displaying information to a computer user. An input device 218, which may include alphanumeric and other keys, buttons, a mouse, a touchscreen, and/or other input elements is coupled to bus 202 for communicating information and command selections to CPU 204 and/or GPU 206. In some embodiments, the computer system 200 may also include a cursor control 220, such as a mouse, a trackball, or cursor direction keys for communicating direction information and command selections to CPU 204 and/or GPU 206 and for controlling cursor movement on display 216. The cursor control 220 typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and program logic which in combination with the computer system causes or programs computer system 200 to be a special-purpose machine. According to one embodiment, the techniques herein are performed by computer system 200 in response to CPU 204 and/or GPU 206 executing one or more sequences of one or more instructions contained in main memory 210. Such instructions may be read into main memory 210 from another storage medium, such as storage device 214. Execution of the sequences of instructions contained in main memory 210 causes CPU 204 and/or GPU 206 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 214. Volatile media includes dynamic memory, such as main memory 210. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to CPU 204 and/or GPU 206 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 210, from which CPU 204 and/or GPU 206 retrieves and executes the instructions. The instructions received by main memory 210 may optionally be stored on storage device 214 either before or after execution by CPU 204 and/or GPU 206.

Computer system 200 also includes a communication interface 208 coupled to bus 202. Communication interface 208 provides a two-way data communication coupling to a network link 222 that is connected to a local network 224. For example, communication interface 208 may be an integrated services digital network (ISDN) card, cable modem, satellite modem, or a modem to provide a data communication connection to a corresponding type of telephone line. As another example, communication interface 208 may be a local area network (LAN) card to provide a data communication connection to a compatible LAN. Wireless links may also be implemented. In any such implementation, communication interface 208 sends and receives electrical, electromagnetic or optical signals that carry digital data streams representing various types of information.

Network link 222 typically provides data communication through one or more networks to other data devices. For example, network link 222 may provide a connection through local network 224 to a host computer 226 or to data equipment operated by an Internet Service Provider (ISP) 228. ISP 228 in turn provides data communication services through the world wide packet data communication network now commonly referred to as the "Internet" 230. Local network 224 and Internet 230 both use electrical, electromagnetic or optical signals that carry digital data streams. The signals through the various networks and the signals on network link 222 and through communication interface 208, which carry the digital data to and from computer system 200, are example forms of transmission media.

Computer system 200 can send messages and receive data, including program code, through the network(s), network link 222 and communication interface 208. In the Internet example, a server 232 might transmit a requested code for an application program through Internet 230, ISP 228, local network 224 and communication interface 208. The received code may be executed by CPU 204 and/or GPU 206 as it is received, and stored in storage device 214, or other non-volatile storage for later execution.

III. Tile Pyramid

Figure 3:
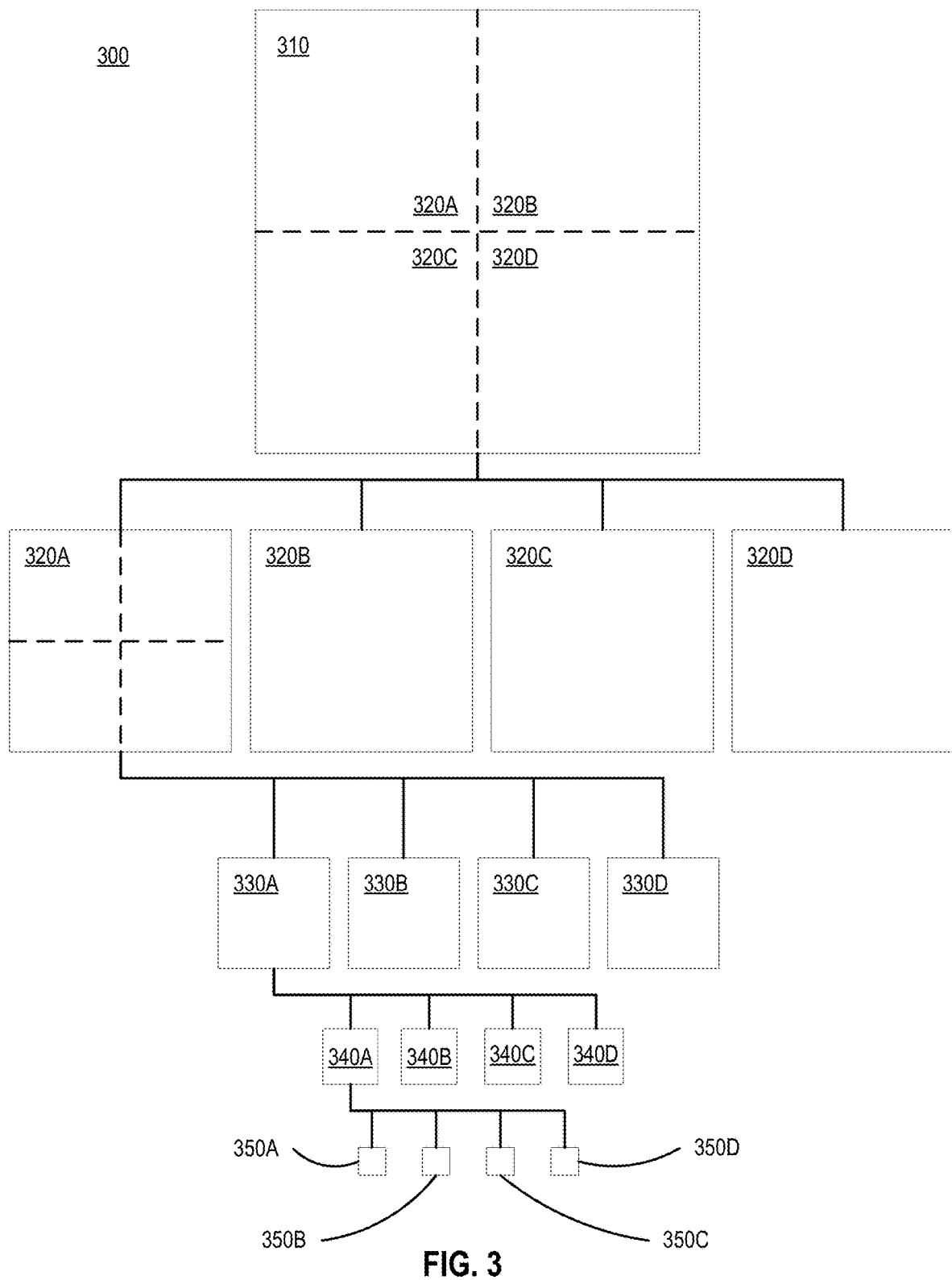
FIG. 3 illustrates a tile pyramid, according to one embodiment.

FIG. 3 illustrates a simplified tile pyramid 300, according to one embodiment. A tile pyramid is a tree of vector tiles. The root of the tree is a singular z0 vector tile 310 with high level vector data for the entire geographic area captured by the electronic map. For example, the z0 vector tile 310 of a world map would define high level geometries and properties for the entire world, such as continents, oceans, and national borders.

This example z0 vector tile 310 has four children, each a z1 vector tile (vector tiles 320A-D) that has more detailed vector data for a quarter of the z0 vector tile. The quarter of the z0 vector tile 310 represented by each z1 vector child is, for example, a Cartesian quadrant of the parent z0 vector tile 310, as represented by dashed lines upon the z0 vector tile 310 in the figure. The more specific vector data each z1 vector tile 320 includes may be, for example, state borders, major rivers and lakes, and mountain ranges. Each z1 vector tile 320 can include vector data similar to that of the z0 vector tile 310. For example, if vector tile 320B includes vector data for both Europe and Asia, a continental border may be included in the vector data.

Similarly, in this example each z1 vector tile 320 has four children in the tree, which each represent a quarter of their respective parent. For example, z1 vector tile 320A has z2 vector tiles 330A-D as children. Each z2 vector tile 330 has more detailed vector data than that of its parent z1 vector tile 320A, similar to how each z1 vector tile 320 included more detailed vector data than their parent, the z0 vector tile 310. For example, each z2 vector tile 330 vector data may include data for major cities, major highways, and forests, plains, deserts and other large geographic features.

In a similar manner, this example tree grows with each zoom level, with each child vector tile having its own four children until a maximum zoom level is reached. z2 vector tile 330A has children z3 vector tiles 340A-D, z3 vector tile 340a has children z4 vector tiles 350A-D, and so on, up to a maximum zoom level. For example, if zoom levels range from 0 to 22, the highest, most zoomed out level, z0, has 1 z0 vector tile 310, the next level, z1, has 4 vector tiles 320, z2 has 16 vector tiles including vector tiles 330, z3 has 64 vector tiles including vector tiles 340, and so on. As zoom level increases, vector tiles show a more geographically-granular level of detail while representing a smaller overall geographic area. While the z0 vector tile 310 may represent the entire world, a z22 vector tile may represent a few square meters or a similarly small geographic area and the features therein.

The tile tree is managed by the mapping application 110 and, as in conjunction with FIG. 2, is stored in the database 125. The client map application 160 may send a request via the wireless network connection 180 to the mapping application 110 for one or more vector tiles, and the mapping application 110 may retrieve the vector tiles from the database 125 and send it to the client map application 160.

A vector tile with the highest zoom level in its family in the render tree may be referred to as a "front-most" vector tile. In one embodiment, only graphical elements (such as labels) from front-most vector tiles are rendered. As such, the rendered electronic map may include vector data from vector tiles of different zoom levels depending upon which vector tiles have been added to the render tree and which of those vector tiles have been rendered. For example, if two vector tiles of level z2 are added to the render tree of an electronic map currently rendering z1 vector tiles, first one z2 vector tile is rendered, then the second; in between the rendering of the first and second z2 vector tiles, vector data from the first z2 vector tile and vector data from one or more z1 vector tiles are rendered simultaneously, as the second z2 vector tile is not yet rendered. However, as the z2 vector tile is front-most, its vector data is swapped in for the remaining z1 vector data once it is rendered.

Each vector tile in the tile pyramid 300 may have its own coordinate system. In this case, the z0 vector tile 310 coordinate system is a "global coordinate system" to which all other vector tiles can be mapped. For example, each z1 vector tile 320 coordinate system covers one fourth the area of the z0 vector tile 310 global coordinate system. As such, in this example there is a power of 2 relationship among coordinates of zoom levels one level of the tree apart from each other, however this relation may vary depending on tree structure and/or the relative geographic area represented by vector tiles of successive zoom levels. In an embodiment, vector tile coordinates converted to global coordinates are rounded down.

IV. AR Tabletop View

The AR module 170 generates AR views. An AR view is a view of a real-world environment, e.g., the view of a real-world environment from a camera of a client device at a particular instant. An AR view includes one or more computer-generated elements. The computer-generated elements may be graphical elements or audio elements, for example, such as visualizations of navigation instructions or verbal expression of the navigation instructions. Such elements are referred to herein in general as "AR elements." AR elements are rectified within the AR view such that they appear at locations within the AR view that are consistent with the real-world environment contained within the AR view. For example, an AR element including a right-facing arrow labeled "turn right" may be rectified within the AR view such that it appears at a particular street corner regardless of the perspective from which it is viewed. Similarly, audio elements may be configured such that they are played only at particular locations within the AR view. For example, the AR module 170 may play a clip of speech saying "turn right" when the AR module 170 detects that the client device is within a threshold distance of a particular location, e.g., the aforementioned street corner. The AR module 170 may use techniques such as geofencing to trigger an action, e.g., playing an audio clip, based on geographic location.

Figure 4:
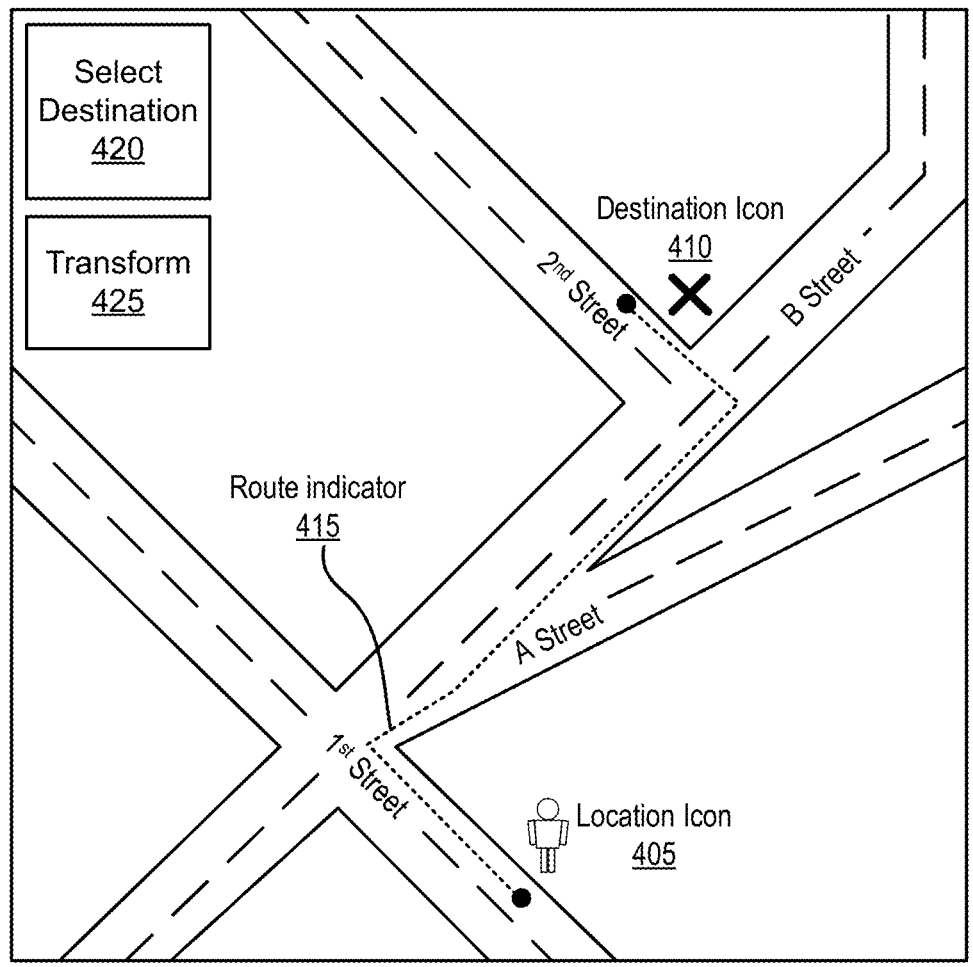
FIG. 4 illustrates an augmented reality tabletop element, according to one embodiment.

FIG. 4 illustrates an AR tabletop element 400, according to one embodiment. An AR tabletop element 400 is an AR element that is included in an AR tabletop view, which is one embodiment of an AR view. As detailed below, another embodiment of an AR view is an AR world view. The AR tabletop element 400 includes a polygonal element illustrating a geographic area, which in FIG. 4 is a rectangle that bounds a bird's-eye view of several streets, including a $1^{st}$ Street, a $2^{nd}$ Street, an A Street, and a B street. The AR tabletop element 400 is rectified such that it appears projected upon a surface within the real-world environment, such as a table, a floor, or a sidewalk.

The AR tabletop element 400 further includes a location icon 405, a destination icon 410, a route indicator 415, and a "select destination" button 420. The location icon 405, destination icon 410, route indicator 415, and "select destination" button 420 are AR elements that serve as components of the AR tabletop element 400 ("AR tabletop component elements") and are rectified in concert with the AR tabletop element 400. For example, if an AR tabletop view changes, e.g., upon the camera panning to a new portion of the real-world environment, the AR tabletop component element 400 rectify based on the rectification of the AR tabletop element 400, and change in similar manners. A 90 degree rotation of the camera may lead to a subsequent AR tabletop view including an AR tabletop element 400 from a different perspective (rotated 90 degrees), and its AR tabletop component elements are likewise shown from the different perspective. The AR tabletop element 400 and its AR tabletop component elements may be represented in a variety of ways depending upon the embodiment. For example, the AR tabletop element 400 and its AR tabletop component elements may each include one or more colors, patterns, shapes, or other general aspects of AR elements.

The geographic area represented by the AR tabletop element 400 is based on an input location. The input location may be a current location or current location estimation of the client device, a location entered into the client map application 160 (e.g., a street address or a latitude/longitude pair), or so on. The input location may be determined by the client device based on GPS data received by the client device, an inertial measurement unit of the client device, techniques such as map matching and the elimination of physical improbabilities, and so on. Map matching and the elimination of physical improbabilities may further be based on map data, e.g., data from one or more vector tiles. In an embodiment, the represented geographic area is a geographic area centered on the input location and constrained by the shape of the AR tabletop element 400, such as a square, centered on the input location, which represents an area that is 500 yards on a side. The input location may be communicated, e.g., between the AR module 170A and the AR module 170B, via a location notification that includes the input location. The location notification may be transmitted via the wireless network connection 180.

The AR module 170 may adjust the AR tabletop element 400 upon user selection, via the mobile computing device 150, of a destination location. The destination location may be a location entered into the client device similarly to the input location, e.g., a street address or a latitude/longitude pair, or may be selected from one or more listed options. The adjustment may include changing the geographic area represented within the AR tabletop element 400 to include both the input location and the destination location. Location icon 405 represents the input location and destination icon 410 represents the destination location within the AR tabletop element 400. In various embodiments the location icon 405 and destination icon 410 may differ graphically in any of a variety of ways, using different shapes, colors, or so on. The adjustment may further include generating the route indicator 415, which illustrates a path from the location icon 405 to the destination icon 410. The route indicator 415 may follow a route generated by the client map application 160 using map vector data, e.g., data pertaining to a road network. The route indicator 415 may be, for example, a dotted line, as in the figure.

The particular vector used by the AR module 170 to generate AR elements may depend upon a zoom level of the AR tabletop element 400. For example, adjustment of the AR tabletop element 400 may cause the AR tabletop element 400 to represent a smaller or greater geographic area than before the adjustment. As such, the adjusted AR tabletop element 400 may use different vector data, e.g., from vector tiles of different zoom levels, depending upon the particular change in area represented by the AR tabletop element 400.

The select destination button 420 may be included within the AR tabletop element 400 and may be used by the user of the client device to select a destination location. In various embodiments, the user selects the select destination button 420 by pressing the select destination button 420 upon a touch screen of the client device, or by clicking on the button using a mouse or other input technique. Upon detecting user selection of the select destination button 420, the AR module 170 may display a user interface with which the user may select a destination location. In other embodiments other or additional buttons may be included, such as a button to input an input location, buttons to change the geographic area represented by the AR tabletop element 400, or so on.

The AR tabletop element 400 may further include buildings and/or other map features based on vector data, e.g., the vector data for the geographic area represented by the AR tabletop element 400. For example, the AR tabletop element 400 may include AR elements representing buildings, roads, street labels (e.g., "$1^{st}$ Street" as seen in the figure) and/or other features included in the vector data. Depending upon the embodiment, the AR tabletop element 400 may be two-dimensional ("2D") or three-dimensional ("3D"). In embodiments where the AR tabletop element 400 is 3D, the AR module 170 may use vector data to make the AR tabletop element's 400 component AR elements, such as the location icon 405, various AR elements representing buildings, and so on, appear proportional to one another. For example, if a first building is twice as tall as a second building, the AR module 170 may generate the AR tabletop element 400 such that the first building is represented as twice as tall as the second building. 3D AR tabletop elements 400 may further include variations in terrain elevation, such as hills or valleys, which are also represented proportionally to the scale of the AR tabletop element 400. Depending upon the embodiment, AR elements may have different levels of occlusion or opacity, such as an embodiment where the location icon 405, destination icon 410, and route indicator 415 are visible through other AR elements included in the AR tabletop element 400.

Figure 5:
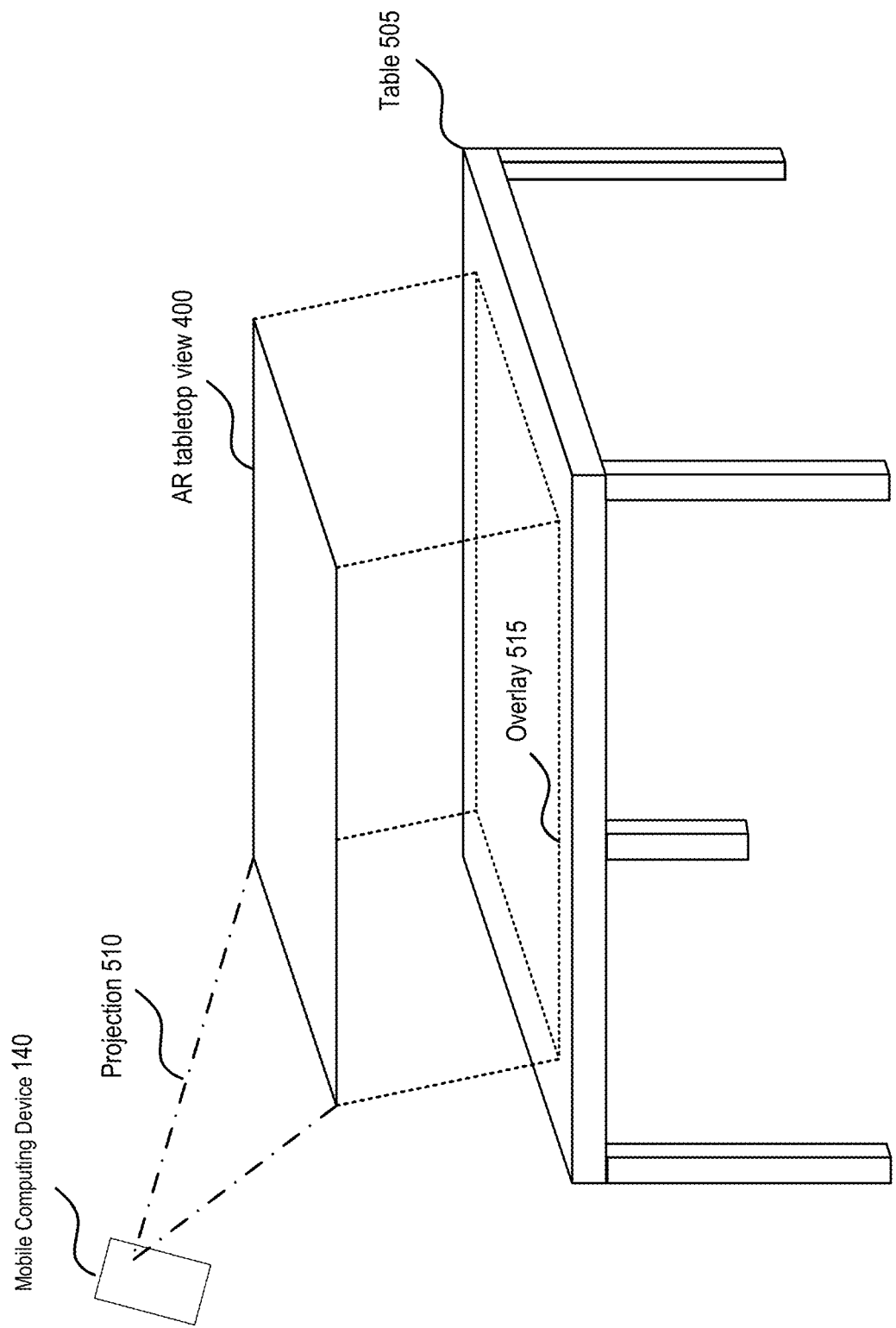
FIG. 5 illustrates overlaying the augmented reality tabletop element upon a physical surface within an augmented reality tabletop view, according to one embodiment.

FIG. 5 illustrates overlaying the AR tabletop element 400 upon a physical surface within an AR tabletop view, according to one embodiment. As mentioned above, the AR tabletop element 400 is oriented upon a surface within the real-world environment. In FIG. 5, the surface within the real-world environment is the tabletop of a table 505. In an embodiment, the surface within the real-world environment upon which the AR tabletop element 400 is placed is flat or no more curved than a threshold amount, e.g., a particular degree of curvature.

The client device, mobile computing device 140 in the figure, projects 510 the AR tabletop element 400 upon the real-world environment. In an embodiment, the AR module 170 does not render the AR tabletop element 400 until a suitable (e.g., flat) surface is identified within the real-world environment captured by the AR view. In an embodiment, the user selects a surface within the real-world environment. For example, the user may use the client device to select a surface within the AR view presented upon the client device. Alternatively, in other embodiments, the AR module 170 analyzes the real-world environment within the AR view and identifies surfaces upon which the AR tabletop element 400 may be projected. In such embodiments, the AR module 170 selects a surface upon which to project the AR tabletop element 400, which may be based, for example, upon a size of the surface, a flatness of the surface, a location of the surface within the AR view, or so on.

Upon identification of a surface, the AR module 170 overlays 515 the AR tabletop element 400 upon the identified surface. In the figure, the AR module 170 overlays 515 the AR tabletop element 400 upon the table 505. The AR tabletop element 400 is projected 510 from the mobile computing device 140, from the perspective of the user that is using the mobile computing device 140 to view the AR tabletop view that includes the AR tabletop element 400. In an embodiment, the AR tabletop view is rendered upon a display of the mobile computing device 140, and the rectification of AR elements within the AR tabletop view, including the AR tabletop element 400, is performed with reference to a camera of the mobile computing device 140, which acts as the reference point ("viewpoint") from which the AR elements are seen.

V. AR World View

An AR world view is an AR view that includes AR elements scaled to the real-world environment. In one embodiment, the AR world view includes the AR elements of the AR tabletop element 400 scaled to the real-world environment. For example, AR elements representing buildings are scaled to the full size of the building, and are situated within the AR world view at the location of the actual building. Similarly, as described below, a route indicator 415 may be scaled to overlay the actual roads navigated by the route, rather than representations of the roads within the AR tabletop view 400.

An AR tabletop view may transform into an AR world view. For example, the AR module 170 may transform an AR tabletop view into an AR world view upon user selection of a button to do so. For example, the user may select a "transform" button 425 upon the user interface. Alternatively, the AR module 170 may transform the AR tabletop view into the AR world view after user selection of a destination location, or after a certain period of time after user selection of a destination location. The transformation may include an animation where the AR tabletop view 400 expands outward as it scales to the size of the real-world environment. Alternatively, the transformation may include an animation where the AR tabletop view 400 appears to zoom in towards the location icon 405, and the other AR elements gradually appear larger as the transformation moves the viewpoint "closer" to the location icon 405.

The AR module 170 transforms the AR tabletop view into the AR world view by applying a 3D transformation operation to the vector data used to generate the AR tabletop element as well as incorporating location information, e.g., a current location estimate and a heading estimate. The 3D transformation operation may include a scaling factor used to scale the AR elements in the AR tabletop view to real-world scale. For example, the vector data may include coordinate points for an AR element, and the coordinate points may be scaled to match the real-world scale (a 1:1 sizing of AR element to real-world counterpart) rather than the compressed AR tabletop view, which may, for example, be a ¹⁄₁₀₀₀ scale of the represented geographic area. The 3D transformation may further include shearing the AR elements along one or more axes, rotating one or more AR elements, performing linear interpolation upon the vector data of one or more AR elements, or so on, such that the AR world view is rectified to fit the real-world environment at real-world scale, from the perspective of the viewpoint. For example, an AR element may be rotated such that the AR element's north, south, east, and west faces face the real world's north, south, east, and west, respectively. Additionally, in some embodiments the AR module 170 uses image recognition to rectify AR elements within the AR world view. For example, the AR module 170 may use image recognition techniques to identify a particular building in the real world environment that is represented in the vector data, and use the particular building as an anchor point to orient AR elements, such as an AR element that is rectified in front of the particular building.

Figure 6:
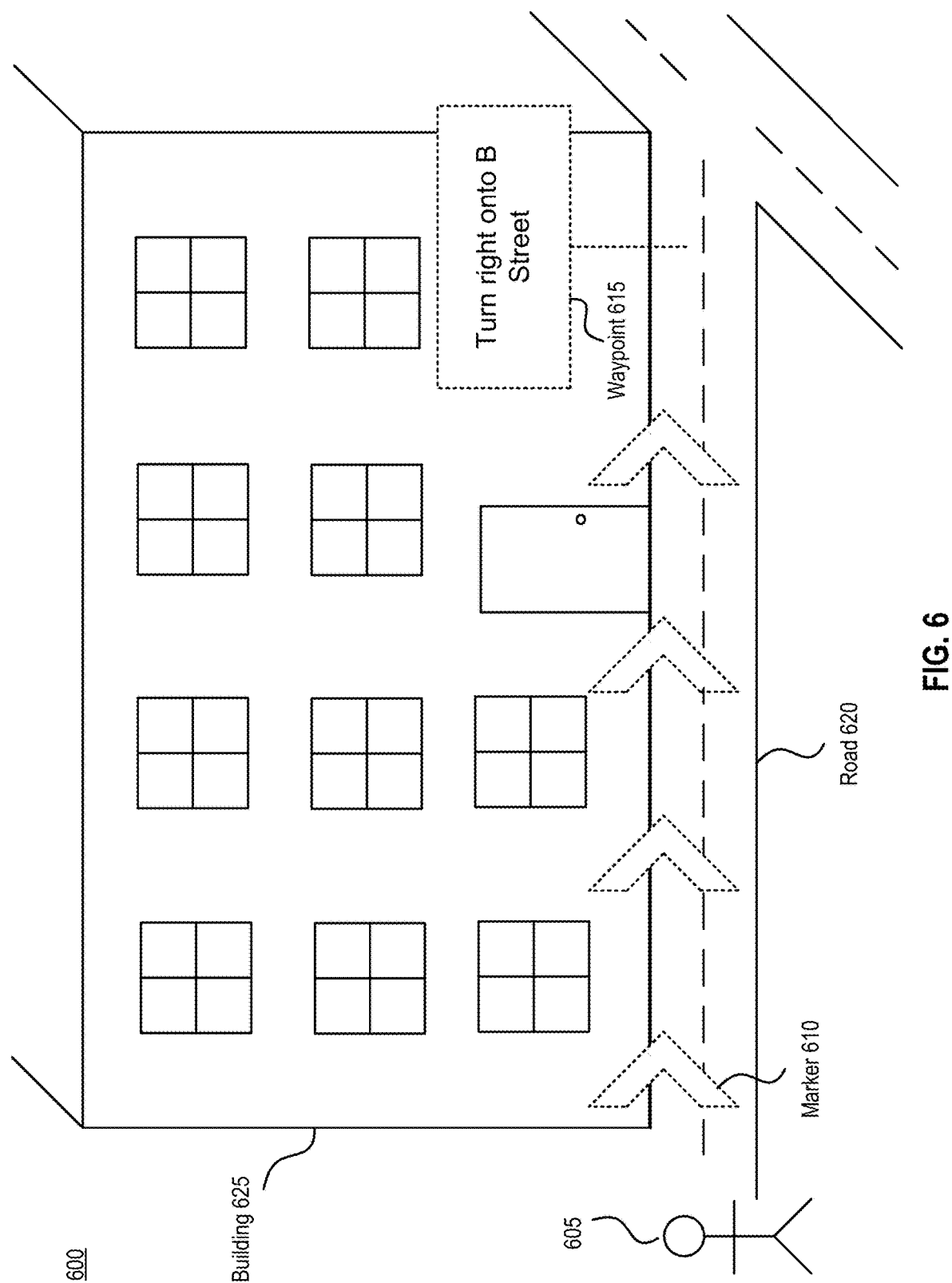
FIG. 6 illustrates an augmented reality world view, according to one embodiment.
Figure 7:
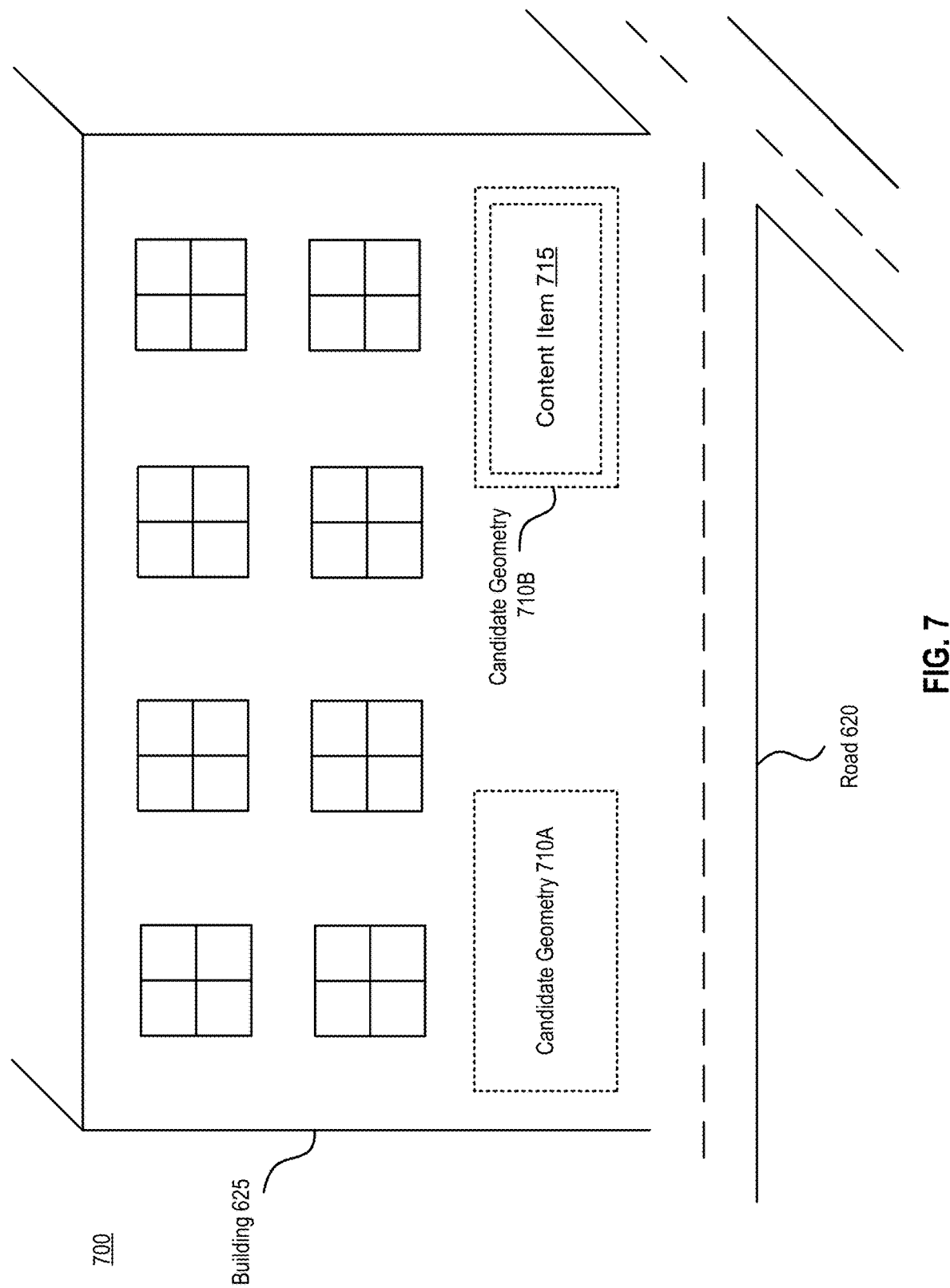
FIG. 7 illustrates a content item at a candidate geometry upon a face of a building, according to one embodiment.

FIG. 6 illustrates an AR world view 600, according to one embodiment. The AR world view 600 includes a user 605, a marker 610, a waypoint 615, a road 620, and a building 625. The road 620 and building 625 are real-world elements seen in the AR world view 600, and the user 605 is a real-world person (rather than AR elements). The marker 610 and the waypoint 615 are AR elements presented within the AR world view. For clarity of explanation, FIG. 6 is not illustrated from the perspective of the user 605, who uses the client device to participate in the AR experience that includes the AR world view. FIG. 7 below illustrates a perspective of the user 605 who uses the client device to participate in the AR experience, according to one embodiment. The user's 605 perspective of the AR world view 600 depends upon the viewpoint of the client device, which in turn may depend upon the location of the client device and the direction it faces. Similar to the AR tabletop view, AR elements in the AR world view are generated and managed by the client device, e.g., mobile computing device 150, and/or the server computer 105.

The marker 610 and the waypoint 615 are, generally, "AR navigation elements" used to indicate a path from one location to another. A person having ordinary skill in the art will recognize that other AR navigation elements may be included in the techniques disclosed herein, in various embodiments, without loss of scope. As one example, another AR navigation element may be a ball that hovers in front of the user and floats in the direction of the destination.

The marker 610 is one of one or more markers that represent the path of the route indicator 415. FIG. 6 illustrates the marker 610 as an arrow pointing in the direction of the path. In other embodiments, the marker 610 may be any AR element. For example, the marker 610 may be any shape, such as an arrow, a line, or a finger, may be one or more colors, and may include one or more patterns, such as the dashed outline upon the marker 610 in the figure. Different markers 610 may be used within the same AR world view. The appearance of the marker 610 may be determined by an implementer of the AR world view, such as an administrator or creator of the mapping application 110 or client map application 160.

Markers 610 trace the path of the route indicator 415 through the AR world view at real-world scale. For example, referring back to FIG. 4, the route indicator 415 follows a path from the location icon 405, continues down $1^{st}$ Street, takes a right turn at B Street, continues down B Street, takes a left at $2^{nd}$ Street, and ends near the destination icon 410. Returning now to FIG. 6, the markers 610 may likewise follow the path from the location icon 405 to the destination icon 410, but may do so upon the real-world streets, instead of upon a down-scaled AR tabletop element 400. For example, the markers 610 may hover a fixed distance above the road 620, and may appear a set distance apart from one another. Both the fixed distance above the ground and the set distance apart from one another may be determined by an input from the implementer of the AR world view. At the real-world corner of $1^{st}$ Street (the road 620) and B Street, the markers 610 may turn right and continue down B Street, similar to how the route indicator 415 turns right and continues down B Street in the AR tabletop element 400. The corner of $1^{st}$ Street and B Street may also include the waypoint 615.

The waypoint 615 is a sign indicating the change in direction at the corner of $1^{st}$ Street and B Street. Depending upon the embodiment, the waypoint 615 may be different shapes or colors, may include different patterns, or so on. The AR world view may include waypoints 615 at one or more locations of change of direction, such as at each turn along a path or navigation route. The waypoint 615 may include text describing the change in direction, such as "Turn right onto B Street" as in the figure. The waypoint 615 may additionally include an audio element, such as a verbal expression of the change in direction. For example, the audio element may be a recording of a voice saying "turn right onto B Street." In some embodiments, the audio element is played upon the client device moving within a threshold distance of the real-world location over which the waypoint 615 is rectified. This may be done, for example, using a geofencing technique. In some embodiments, one or more waypoints 615 include a content item in addition to or rather than an indication of a change in direction, as further described below. Furthermore, in some embodiments, the AR module 170 removes the waypoint 615 upon the client device moving within a threshold distance of the waypoint 615, or upon the client device moving past the waypoint 615 along the path to the destination.

In an embodiment, some or all AR elements, such as marker 610 and waypoint 615, are displayed only upon the client device moving within a threshold distance of the AR elements. For example, the AR module 170 may render an AR element within the AR world view only if the AR element is rectified within the AR world view at a position less than 100 yards from a current location of the client device.

FIG. 7 illustrates a content item at a candidate geometry upon a face of a building 625, according to one embodiment. This AR world view 700 includes the building 625 and the road 620 as well as two candidate geometries 710A-B and a content item 715. Other elements, such as the user 605 and the marker 610, are excluded from the figure for purposes of clarity, though may be present in various embodiments.

The candidate geometries 710 are surfaces, or more complex geometries that include surfaces, upon which content items 715 may be displayed, such as geometries representing buildings or billboards. Candidate geometries 710 are determined by the AR module 170 based on vector data, such as a vector tile. For example, a set of candidate geometries 710 may be determined for a particular geographic area by the AR module 170 based on a set of vector data from a vector tile that represents the particular geographic area, such that each candidate geometry 710 in the set of candidate geometries 710 includes at least a threshold area that curves no more than a threshold amount, e.g., faces of buildings, mountainsides, the sky, billboards, or so on. Candidate geometries 710 may be determined differently in different embodiments, such that various surfaces are identified, based on vector data, for presentation of content items 715. Vector data may be used to identify a candidate geometry 710, for example, by calculating a size of a face of a building (e.g., building 625) based on the coordinate points pertaining to the face that are used to represent the building 625 in the vector data. In various embodiments, multiple candidate geometries 710 may be determined for the same surface if the surface is determined to be large enough, such as candidate geometries 710A-B upon building 625.

Content items 715 are displayed at candidate geometries 710. A content item may be an image, a set of images, a text string, a video, or the like, which includes a graphical element and, in some instances, an audio element. Content items 715 may be displayed at candidate geometries 710 upon the client device moving within a threshold distance of the candidate geometry 710. Furthermore, content items 715 may be displayed based on a relevance to the user of the client device, as determined using one or more relevance score techniques, which may be based, for example, upon browser history data upon the client device. Alternatively, the AR module 170 may receive content items 715 from third parties and display the content items 715 responsive to a payment from the third parties, or so on.

In an embodiment, one or more content items 715 within an AR world view involve information pertaining to places of interest (POI) as recorded within the vector data. For example, various real-world POI may include candidate geometries 710 at which content items 715 are placed that describe the POI using the information within the vector data. As a specific example, a set of POI may be all café's within one mile of the location of the client device. The AR module 170 may identify each café in the set that includes a candidate geometry 710 (e.g., has a large enough surface, such as a facade) and place a content item 715 at the candidate geometry 710 that includes text describing the café's name, hours of operation, popular menu items, phone number, estimated wait for service, or so on. In an embodiment, the AR module 170 presents the content item 715 at the candidate geometry 710 only upon the candidate geometry 710 entering the viewpoint, or upon the candidate geometry 710 entering a location within the viewpoint, e.g. a center of the viewpoint.

In an embodiment, the AR module 170 may use AR elements to represent real-world elements that are not visible in the real world environment. For example, a user uses a client device to hire a car for a ride. If the car is several blocks away, the user may not be able to see the car in the real world environment. However, an AR element representing the car may be added to the AR world view, rectified to the location of the real-world car, such that the user can "see" the car approaching. Similarly, other real world elements may be represented by AR elements, such as other people.

Vector data may be used to determine an opacity or occlusion of an AR element or of part of an AR element. For example, the AR module 170 may analyze vector data for two buildings from the perspective of the viewpoint and determine that one of the buildings is partially obstructed by the other in the real-world environment, such as in a scenario where the perspective is near a corner of an intersection facing one of the buildings that is across the street. The AR module 170 may therefore determine that a candidate geometry 710 at the partially obstructed building is also partially obstructed. As such, a part of a candidate item 715 shown at the part of the candidate geometry 710 that is partially obstructed may be rendered as occluded, e.g., may not be visible. Furthermore, as the AR experience continues and the viewpoint changes, e.g., as the client device approaches the street corner to return to the earlier example, the part of the candidate geometry 710 that is obstructed may change (e.g., shrink smaller or grow larger). As such, more or less of the content item 715 shown at that candidate geometry 715 may be occluded. In this way, AR elements may better appear to be immersive aspects of the real-world environment.

VI. Processes

Figure 8:
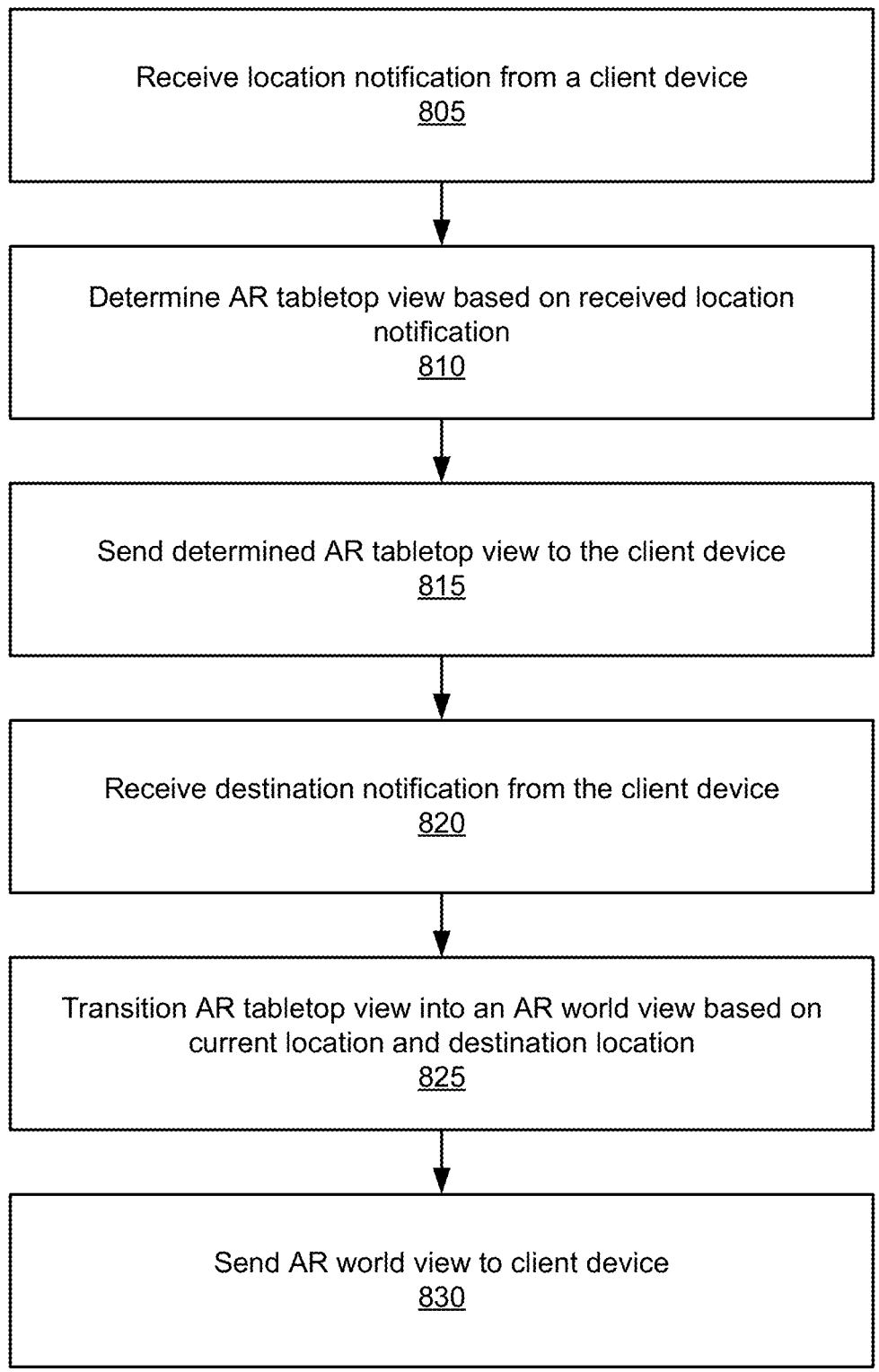
FIG. 8 illustrates a process for augmented reality visualization transitions, according to one embodiment.

FIG. 8 illustrates a process for AR visualization transitions, according to one embodiment. As noted above, AR tabletop views can transition into AR world views, such as upon user selection of a destination. The user may use both the AR tabletop view and the AR world view to better understand map data. Both the AR tabletop view and the AR world view better represent map data in a manner more intuitive to a user than previous electronic maps.

The AR module 170 receives 805 a location notification from a client device. The location notification is a location reading or estimate (a "current location") of the client device, such as a latitude and longitude pair. The location notification may further include a bearing, as well as other movement information, such as a speed of the client device. The AR module 170 may convert the information within the location notification into a format appropriate for use by components of the AR module 170.

The AR module 170 determines 810 an AR tabletop view based on the received location notification. In particular, the AR module 170 uses the current location included in the location notification to determine an input location with which to orient the AR tabletop view. For example, the input location may be a starting point around which the AR module 170 builds the AR tabletop view, and may be centered within the AR tabletop view. In an embodiment, the location notification also includes additional information, such as a bearing or orientation of the client device, which the AR module 170 may use to rectify the AR tabletop view (e.g., the AR tabletop view's "North" faces the real-world environment's North). AR module 170 may access vector data, e.g., vector tiles, that represent a geographic area including or surrounding the input location, and use the accessed vector data to assemble the AR tabletop view. For example, the AR module 170 may access a vector tile that includes the current location, and use the vector data of the vector tile, such as road data, building data, and the like, to generate a to-scale and properly oriented AR tabletop view. In some embodiments, the AR module 170 generates the location icon 405 and positions it within the AR tabletop view at the current location (as represented within the AR tabletop view, rather than at the current location within the real-world environment).

The AR module 170 sends 815 the determined AR tabletop view to the client device. For example, AR module 170B may transmit the AR tabletop view via the wireless network connection 180 to the mobile computing device 150. Henceforth the AR module 170A receives the determined AR tabletop view, generates an AR experience including the AR tabletop view (using, for example, UNITY (including the ARINTERFACE plugin), ARKIT, ARCORE, and/or other AR software developer's kits (SDK); these and other software and/or hardware tools may be used at this step and elsewhere to implement the techniques disclosed herein), and sends it for display, e.g., at display 216. Alternatively, the AR module 170A sends 815 the AR tabletop view to another component of the mobile computing device 150 and/or operates in conjunction with another component of the mobile computing device 150, such as a graphics driver, to display the AR tabletop view using the display 216 of the mobile computing device 150.

The AR module 170 receives 820 a destination notification from the client device. The destination notification includes a destination location. For example, the user selects or inputs a destination location using an interface (e.g., at input device 218), which the AR module 170 receives from the mobile computing device 150. The AR module 170 may generate a destination icon 410 using the destination location and place the destination icon 410 at the destination location upon the AR tabletop view (e.g., at the destination location as represented within the AR tabletop view). Furthermore, the AR module 170 may determine a route from the current location to the destination location, generate a route indicator 415 based on the determined route, and add the generated route indicator 415 to the AR tabletop view. The AR module 170 may use DIRECTIONS API or other software and/or hardware to determine the route using vector data.

The AR module 170 transitions 825 the AR tabletop view into an AR world view based on the current location and the destination location. As detailed above, the transition 825 involves a transform operation and may be prompted by different actions depending upon the embodiment, such as upon detection by the AR module 170 of user selection of a button to transition 825. Alternatively, the transition 825 may be prompted by the AR module 170 receiving 820 the destination notification. The transition 825 involves the generation of an AR world view from the vector data used in the AR tabletop view, the current location, and the destination location, though other or additional data may be involved in various embodiments, such data pertaining to the determined route. The transition 825 exchanges the AR tabletop view for the AR world view and involves an animation, such as a "zooming in" to the AR tabletop view such that the exchange appears to be a seamless transition.

The AR module 170 sends 830 the AR world view to the client device for display. For example, the AR module 170A sends the AR world view to the display 216. Alternatively, the AR module 170B may transmit the AR world view via the wireless network connection 180 to the AR module 170A, which then formats the AR world view for display and propagates the AR world view to the display 216. In an embodiment, the AR world view is sent 830 for display as part of the transition 825, which interpolates between the AR tabletop view and the AR world view when animating the transition from the one to the other.

In an embodiment, the client device receives a selection from the user of one or more AR elements or types of AR elements to include or to not include in an AR tabletop view and/or AR world view. For example, the AR module 170 may include a list of different types of vector data for which AR elements may be displayed, such as restaurants, roads, parks, streets, and so on. The AR module 170 receives user selection of one or more types of vector data and includes AR elements corresponding to the one or more types of vector data in the AR tabletop view and/or AR world view. For example, as disclosed above, the user may select to include AR elements pertaining to cafés in the AR tabletop view and/or AR world view, and vector data pertaining to the cafes may therefore be represented via AR elements within the AR tabletop vie wand/or AR world view.

Figure 9:
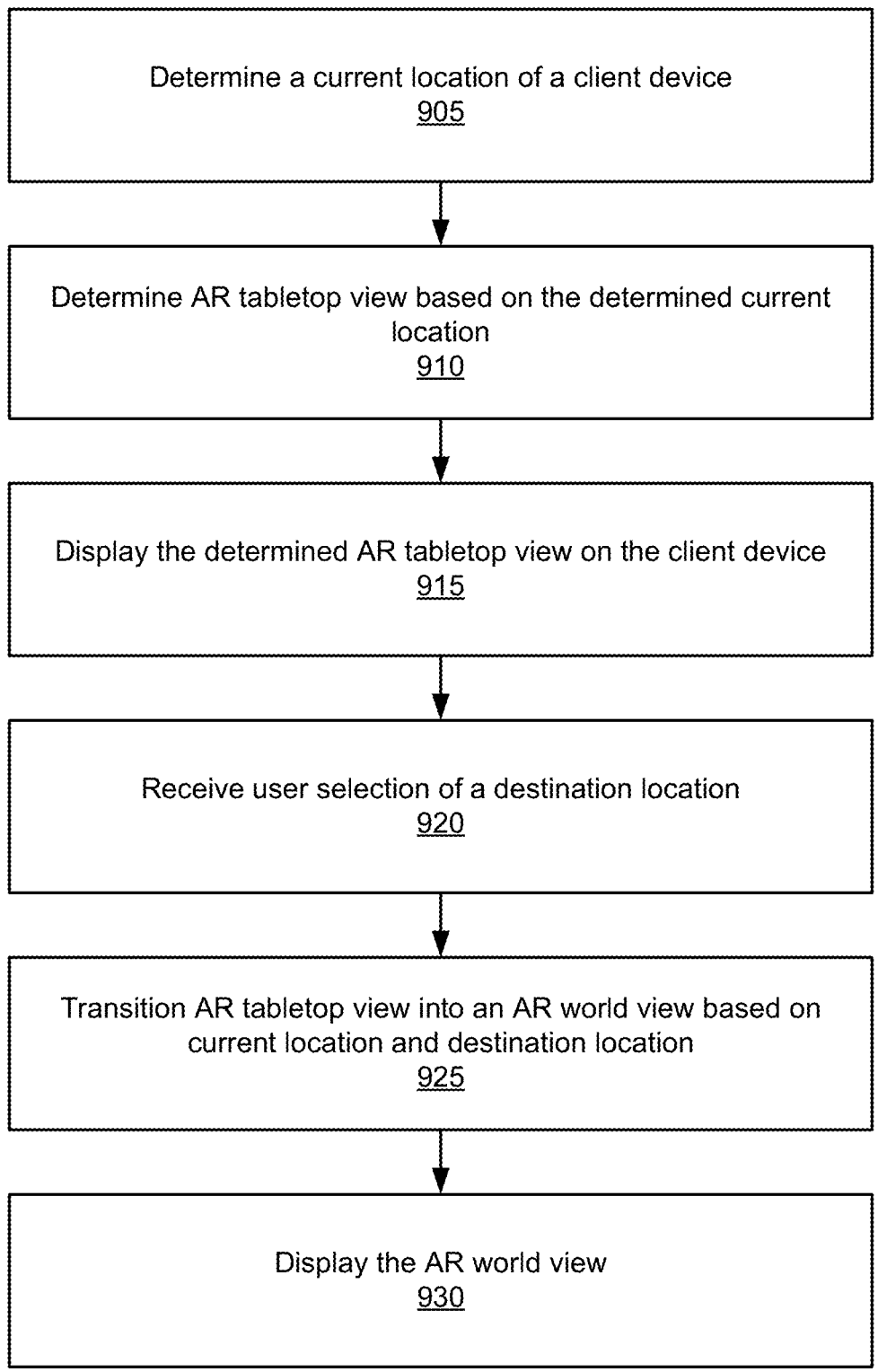
FIG. 9 illustrates a process for augmented reality visualization transitions, according to one embodiment.

FIG. 9 illustrates a process for augmented reality visualization transitions, according to one embodiment. The process of FIG. 9 is performed entirely upon the client device by the AR module 170A. The client device determines 905 a current location of the client device. The current location is a location reading or estimate of the client device, such as a latitude and longitude pair. The current location may further include a bearing, as well as other movement information, such as a speed of the client device. The AR module 170A may convert the information into a format appropriate for use by components of the AR module 170A.

The AR module 170A determines 910 an AR tabletop view based on the determined current location. The determined AR tabletop view includes geographic information representing a geographic area that includes the determined current location of the client device. In particular, the AR module 170A uses the current location to determine an input location with which to orient the AR tabletop view. For example, the input location may be a starting point around which the AR module 170A builds the AR tabletop view, and may be centered within the AR tabletop view.

In an embodiment, additional information is included in the current location, such as the bearing or orientation of the client device, and the AR module 170A uses the additional information to rectify the AR tabletop view (e.g., the AR tabletop view's "North" faces the real-world environment's North). AR module 170A may access vector data, e.g., vector tiles, that represent a geographic area including or surrounding the input location, and use the accessed vector data to assemble the AR tabletop view. For example, the AR module 170A may access a vector tile that includes the current location, and use the vector data of the vector tile, such as road data, building data, and the like, to generate a to-scale and properly oriented AR tabletop view. The vector data may be stored, for example, in a cache or other memory of the client device. In some embodiments, the AR module 170A generates the location icon 405 and positions it within the AR tabletop view at the current location (as represented within the AR tabletop view, rather than at the current location within the real-world environment).

The AR module 170A displays 915 the determined AR tabletop view on the client device. Depending upon the embodiment, this may involve the AR module 170A generating an AR experience including the AR tabletop view, as described above. Displaying 915 the determined AR tabletop view may further involve use of a graphics driver of the client device to display the AR tabletop view using the display 216.

The AR module 170A receives 920 user selection of a destination location. For example, the user selects or inputs a destination location using an interface (e.g., at input device 218). The AR module 170A may generate a destination icon 410 using the destination location and place the destination icon 410 at the destination location upon the AR tabletop view (e.g., at the destination location as represented within the AR tabletop view). Furthermore, the AR module 170A may determine a route from the current location to the destination location, generate a route indicator 415 based on the determined route, and add the generated route indicator 415 to the AR tabletop view. The AR module 170A may use DIRECTIONS API or other software and/or hardware to determine the route using vector data.

The AR module 170A transitions 925 the AR tabletop view into an AR world view based on the current location and the destination location. As detailed above, the transition 925 involves a transform operation and may be prompted by different actions depending upon the embodiment, such as upon detection by the AR module 170A of user selection of a button to transition 925. Alternatively, the transition 925 may be prompted by the AR module 170A receiving 920 the user selection of a destination location. The transition 925 involves the generation of an AR world view from the vector data used in the AR tabletop view, the current location, and the destination location, though other or additional data may be involved in various embodiments, such data pertaining to the determined route. The transition 925 exchanges the AR tabletop view for the AR world view and involves an animation, such as a "zooming in" to the AR tabletop view such that the exchange appears to be a seamless transition.

The AR module 170A displays 930 the AR world view at the client device. For example, the AR module 170A sends the AR world view to the display 216. In an embodiment, the AR world view is displayed 930 as part of the transition 925, which interpolates between the AR tabletop view and the AR world view when animating the transition from the one to the other.

In an embodiment, the client device receives a selection from the user of one or more AR elements or types of AR elements to include or to not include in an AR tabletop view and/or AR world view. For example, the AR module 170A may include a list of different types of vector data for which AR elements may be displayed, such as restaurants, roads, parks, streets, and so on. The AR module 170A receives user selection of one or more types of vector data and includes AR elements corresponding to the one or more types of vector data in the AR tabletop view and/or AR world view. For example, as disclosed above, the user may select to include AR elements pertaining to cafés in the AR tabletop view and/or AR world view, and vector data pertaining to the cafes may therefore be represented via AR elements within the AR tabletop vie wand/or AR world view.

VII. Additional Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   receiving a location notification from a client device comprising a first current location of the client device;
   responsive to receiving the location notification, determining an AR tabletop view based on the first current location, wherein the AR tabletop view comprises a downscaled AR model of a geographic area that is rectified upon a first surface and that includes the first current location of the client device;
   sending the determined AR tabletop view to the client device;
   determining that a perspective of the client device has changed;
   responsive to determining the perspective of the client device has changed, rectifying the AR tabletop view upon a second surface different from the first surface;
   receiving a destination notification from the client device, wherein the destination notification comprises an indication of a user selection of a destination location within the geographic area;
   responsive to receiving the user selection of the destination location, transitioning the AR tabletop view into an AR world view comprising a three-dimensional real-world scale representation of the geographic information based at least in part on the first location and the destination location, the AR world view further comprising a plurality of AR navigation elements each indicating a route direction towards the destination location;
   sending the AR world view to the client device;
   receiving a second current location of the client device; and
   responsive to determining the second current location of the client device is within a geofence bounding a geographical area represented by a particular AR navigation element of the plurality of AR navigation elements that indicates a route direction beyond the first current location, sending the particular AR navigation element to the client device for display.

2. The method of claim 1, wherein the AR tabletop view comprises at least one AR tabletop component element.

3. The method of claim 1, wherein the geographic information is vector data.

4. The method of claim 1, wherein at least one of the AR tabletop view and the AR world view is rectified based on at least one of image recognition, the current location, and a bearing of the client device.

5. The method of claim 1, further comprising:
   receiving a third current location of the client device; and
   responsive to determining the third current location of the client device is beyond the geofence of the particular AR navigation element, sending to the client device instructions to remove the particular AR navigation element from the AR world view.

6. A non-transitory computer-readable medium storing computer program instructions executable by a processor, the instructions comprising:
   receiving a location notification from a client device comprising a first current location of the client device;
   responsive to receiving the location notification, determining an AR tabletop view based on the first current location, wherein the AR tabletop view comprises a downscaled AR model of a geographic area that is rectified upon a first surface and that includes the first current location of the client device;
   sending the determined AR tabletop view to the client device;
   determining that a perspective of the client device has changed;
   responsive to determining the perspective of the client device has changed, rectifying the AR tabletop view upon a second surface different from the first surface;
   receiving a destination notification from the client device, wherein the destination notification comprises an indication of a user selection of a destination location within the geographic area;
   responsive to receiving the user selection of the destination location, transitioning the AR tabletop view into an AR world view comprising a three-dimensional real-world scale representation of the geographic information based at least in part on the first location and the destination location, the AR world view further comprising a plurality of AR navigation elements each indicating a route direction towards the destination location;
   sending the AR world view to the client device;
   receiving a second current location of the client device; and
   responsive to determining the second current location of the client device is within a geofence bounding a geographical area represented by a particular AR navigation element of the plurality of AR navigation elements that indicates a route direction beyond the first current location, sending the particular AR navigation element to the client device for display.

7. The non-transitory computer-readable medium of claim 6, wherein the AR tabletop view comprises at least one AR tabletop component element.

8. The non-transitory computer-readable medium of claim 6, wherein the geographic information is vector data.

9. The non-transitory computer-readable medium of claim 6, wherein at least one of the AR tabletop view and the AR world view is rectified based on at least one of image recognition, the current location, and a bearing of the client device.

10. The non-transitory computer-readable medium of claim 6, the instructions further comprising:
receiving a third current location of the client device; and
responsive to determining the third current location of the client device is beyond the geofence of the particular AR navigation element, sending to the client device instructions to remove the particular AR navigation element from the AR world view.

11. A system, comprising:
a processor; and
a non-transitory computer-readable medium storing computer program instructions executable by a processor, the instructions comprising:
receiving a location notification from a client device comprising a first current location of the client device;
responsive to receiving the location notification, determining an AR tabletop view based on the first current location, wherein the AR tabletop view comprises a downscaled AR model of a geographic area that is rectified upon a first surface and that includes the first current location of the client device;
sending the determined AR tabletop view to the client device;
determining that a perspective of the client device has changed;
responsive to determining the perspective of the client device has changed, rectifying the AR tabletop view upon a second surface different from the first surface;
receiving a destination notification from the client device, wherein the destination notification comprises an indication of a user selection of a destination location within the geographic area;
responsive to receiving the user selection of the destination location, transitioning the AR tabletop view into an AR world view comprising a three-dimensional real-world scale representation of the geographic information based at least in part on the first location and the destination location, the AR world view further comprising a plurality of AR navigation elements each indicating a route direction towards the destination location;
sending the AR world view to the client device;
receiving a second current location of the client device; and
responsive to determining the second current location of the client device is within a geofence bounding a geographical area represented by a particular AR navigation element of the plurality of AR navigation elements that indicates a route direction beyond the first current location, sending the particular AR navigation element to the client device for display.

12. The system of claim 11, wherein the AR tabletop view comprises at least one AR tabletop component element.

13. The system of claim 11, wherein at least one of the AR tabletop view and the AR world view is rectified based on at least one of image recognition, the current location, and a bearing of the client device.

14. The system of claim 11, wherein the geographic information is vector data.

15. The method of claim 1, further comprising:
receiving, from the client device, a selection of a subset of augmented reality (AR) element types from a plurality of AR element types, wherein each AR element type corresponds to a different set of vector data comprising AR elements of the respective type;
wherein the AR tabletop view includes AR elements only of the selected subset of AR element types, and the AR world view includes only the plurality of AR navigation elements and AR elements of the selected subset of AR element types besides the AR navigation elements.

16. The non-transitory computer-readable medium of claim 6, the instructions further comprising:
receiving, from the client device, a selection of a subset of augmented reality (AR) element types from a plurality of AR element types, wherein each AR element type corresponds to a different set of vector data comprising AR elements of the respective type;
wherein the AR tabletop view includes AR elements only of the selected subset of AR element types, and the AR world view includes only the plurality of AR navigation elements and AR elements of the selected subset of AR element types besides the AR navigation elements.

17. The system of claim 11, the instructions further comprising:
receiving, from the client device, a selection of a subset of augmented reality (AR) element types from a plurality of AR element types, wherein each AR element type corresponds to a different set of vector data comprising AR elements of the respective type;
wherein the AR tabletop view includes AR elements only of the selected subset of AR element types, and the AR world view includes only the plurality of AR navigation elements and AR elements of the selected subset of AR element types besides the AR navigation elements.

18. The system of claim 11, the instructions further comprising:
receiving a third current location of the client device; and
responsive to determining the third current location of the client device is beyond the geofence of the particular AR navigation element, sending to the client device instructions to remove the particular AR navigation element from the AR world view.

* * * * *